(12) United States Patent
Michel et al.

(10) Patent No.: US 8,322,729 B2
(45) Date of Patent: Dec. 4, 2012

(54) DEVICE FOR ADJUSTING CAMBER AND/OR TOE

(75) Inventors: Wilfried Michel, Riedenburg (DE); Hugo Müller, Rohrenfels-Ballersdorf (DE); Karl-Heinz Meitinger, München (DE); Christoph Kossira, Ingolstadt (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/320,604

(22) PCT Filed: May 3, 2010

(86) PCT No.: PCT/EP2010/002678
§ 371 (c)(1),
(2), (4) Date: Feb. 6, 2012

(87) PCT Pub. No.: WO2010/130342
PCT Pub. Date: Nov. 18, 2010

(65) Prior Publication Data
US 2012/0126498 A1    May 24, 2012

(30) Foreign Application Priority Data
May 15, 2009    (DE) .................. 10 2009 021 477

(51) Int. Cl.
*B60G 3/26*    (2006.01)
(52) U.S. Cl. .................................. 280/5.52; 280/86.75

(58) Field of Classification Search .............. 280/5.52, 280/5.521, 5.522, 86.75, 86.751, 86.758, 280/93.503, 93.504, 124.134, 124.135, 124.15
See application file for complete search history.

(56) References Cited

U.S. PATENT DOCUMENTS
2002/0036385 A1    3/2002    Mackle et al.
2007/0290473 A1    12/2007    Buma
2008/0257081 A1    10/2008    Hakui et al.

FOREIGN PATENT DOCUMENTS
DE    10 2008 01136    4/2009
FR    2 884 795    10/2006
WO    WO 98/16418 A1    4/1998
WO    WO 2008/052531 A1    5/2008

*Primary Examiner* — Joseph Rocca
*Assistant Examiner* — Timothy Wilhelm
(74) *Attorney, Agent, or Firm* — Henry M.Feiereisen, LLC

(57) ABSTRACT

The invention relates to a device for adjusting the camber and/or toe of the wheels (20) of wheel suspensions (10), especially for motor vehicles, including a wheel carrier (12) on which the respective wheel (20) is rotatably mounted and which is subdivided into a carrier part (24) receiving the wheel, a guide part (22) connected to the wheel suspension (10), and two rotary parts, especially control cylinders (26, 28), arranged between the carrier part and the guide part and rotatable in relation to each other, to the carrier part (24) and to the guide part (22) about a common rotation axis (32). Each of the rotary parts can be moved by a drive (40) and a servo drive (42) in both directions of rotation. According to the invention, the servo drive (42) is designed for at least one of the rotary parts (26, 28) as a planetary gear train (42), and the planetary gear train (42) is especially radially externally arranged around the rotary part (26, 28).

18 Claims, 3 Drawing Sheets

DEVICE FOR ADJUSTING CAMBER AND/OR TOE

CROSS-REFERENCES TO RELATED APPLICATIONS

This application is the U.S. National Stage of International Application No. PCT/EP2010/002678, filed May 3, 2010, which designated the United States and has been published as International Publication No. WO 2010/130342 and which claims the priority of German Patent Application, Serial No. 10 2009 021 477.1, filed May 15, 2009, pursuant to 35 U.S.C. 119(a)-(d).

BACKGROUND OF THE INVENTION

The invention relates to a device for adjusting camber and/or toe of the wheels of wheel suspensions, in particular for motor vehicles.

Various technical solutions with respect to rear-axle steering of a (road) vehicle are available. In general, the tie rod is pushed or also its length is modified. Moreover, there exist configurations with split wheel carrier, as described in US 20020036385 or in FR 2884795 for example. The rotary parts or control cylinders determinative for the camber and/or toe of the wheel are adjusted hereby by servo drives (for example a spur gear mechanism) and electric motors in opposite direction or in same direction in both rotational directions.

In a generic, multipart wheel carrier, the toe-in and/or the camber are modified by respectively pivoting the two slantingly configured cylinders. As the cardan shaft has to be guided centrally through the adjustment cylinders, the adjusting drive can only be established from radially outside.

On the one hand, the strength of the gearing has proven problematic in the context of dimensioning the required motor power and calculating the gear stage. On the other hand, the required multiplication cannot be implemented through a simple pinion/gear stage. Furthermore, spatial conditions do not allow to randomly place the drive in axial measuring chain or in radial measuring chain.

SUMMARY OF THE INVENTION

It is an object of the invention to provide a device of the generic type which is favorable to construct and to manufacture and is designed especially durable for operating conditions encountered in wheel suspensions.

The object is solved in accordance with the invention by a device for adjusting camber and/or toe of the wheels of wheel suspensions, in particular for motor vehicles, comprising a wheel carrier on which the respective wheel is rotatably supported and which is subdivided in a carrier part holding the wheel, a guide part connected with the wheel suspension, and two rotary parts, in particular control cylinders, which are arranged in-between and rotatable relative to one another as well as to the carrier part and to the guide part about a common rotation axis and which can be respectively adjusted in both rotation directions by a drive and a servo drive, wherein the servo drive for at least one of the rotary parts or control cylinders, preferably for both rotary parts, is configured as planetary gear train, and the planetary gear train is arranged about the rotary part in particular radially externally. As a consequence of increased tooth meshing, such a gear mechanism provides a robust torque transmission and torque support and can advantageously be constructively integrated in the wheel carrier.

In particular, the drive as planetary gear train can be configured in combination with a disk motor. The disk motor has an exceedingly great motor torque while having minimum stator winding. The strength of the gears poses no longer any problems.

Preferably, the electric motor-driven annulus of the planetary gear train can be rotatably supported on the carrier part and/or on the guide part, with the inner planetary gears being supported on bearing pins of the carrier part and/or guide part and meshing with the annulus and a sun gear arranged on the control cylinder. As the annulus has a relatively large diameter, driving torque can be reliably introduced via the annulus while being able to select beneficial transmission ratios. Moreover, the control cylinders can easily be manufactured and provide easy clearance for a cardan joint extending centrally through the control cylinders. Using an annulus, large planet gears (four planet gears) and a large gear on the adjustment cylinder establishes a far greater contact ratio than a single tooth engagement with small pinion (only one pinion).

The annulus of the planetary gear train is floatingly supported preferably via a double-row rolling-contact bearing on the carrier part and/or guide part, resulting in a particularly weight-beneficial construction.

Furthermore, the annulus may be driven directly by an electric disk motor having a disk rotor mounted on the outer circumference of the annulus and stator windings mounted on the carrier part and/or guide part. Having minimum, weight-favorable stator windings enables the disk motor to introduce high drive torques in both rotational directions and easy ring-shaped arrangement on the carrier part and/or guide part of the wheel carrier and optionally within the wheel rim.

When a wheel suspension is involved which is known per se and has two axis-parallel projecting and diametrically confronting cantilevers or universal-joint fork on each of the carrier part and the guide part for support of a universally mounted support ring, the planet gears are arranged according to an advantageous refinement of the invention in a particularly constructively and spatially space-saving manner in the respective clearances between the cantilevers. In particular, in order to increase tooth engagement, respectively four planet gears are distributed symmetrically about the circumference between the cantilevers. The four pockets or clearances of the universal-joint fork are available for installation of the planet gears. As a result, the drive can be made very compact.

For support of the reaction torque which may act on the control cylinders and results from the static and dynamic wheel loads, an electromotive brake may be provided on the disk rotor between the stator windings to brake (for example spring-loaded) the disk rotor in de-energized state to a standstill and to electromagnetically disengage when the disk motor is activated.

Finally, a covering cap may be provided between the disk motor and the corresponding control cylinders for encapsulating the planetary gear train and to protect the planetary gear train against harmful environmental impacts like splash water, dirt, etc. The covering cap may be mounted to the ring-shaped housing of the disk motor and seal each of the corresponding control cylinders through interposition of a ring seal.

BRIEF DESCRIPTION OF THE DRAWING

An exemplary embodiment of the invention will now be described in greater detail. The schematic drawing shows in.

DETAILED DESCRIPTION OF PREFERRED EMBODIMENTS

Figure 1:
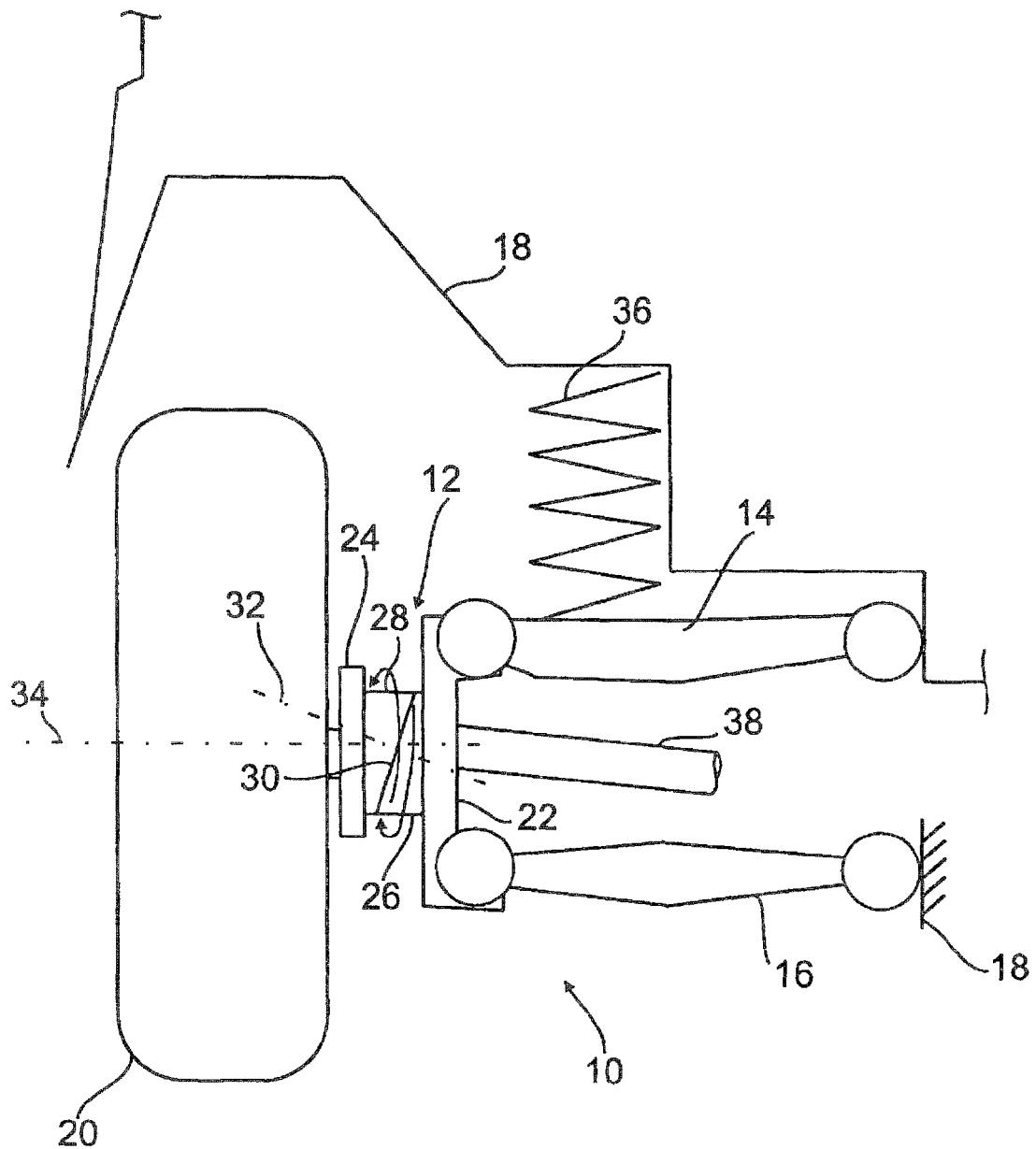
FIG. 1 a wheel suspension for motor vehicles with a multipart wheel carrier articulated to wheel guide elements and having a wheel which is adjustable by two rotatable control cylinders, with each of the control cylinders being rotatable by a servo drive and an electric motor.

FIG. 1 shows a rough schematic illustration of a wheel suspension 10 for motor vehicles which has a wheel carrier 12 articulated via transverse links 14, 16 as wheel guide elements to a body 18, hinted here only.

The wheel carrier 12 which rotatably holds the wheel 20 is subdivided in a guide part 22 which is articulated to the transverse links 14, 16, a carrier part 23 which holds the wheel 20 via a respective wheel bearing (not shown), and two control cylinders 26, 28 which are rotatably supported on the guide part 22 and the carrier part 24 and adjustable about a rotation axis 32 extending in perpendicular relationship to confronting inclined surfaces 30. By pivoting one or both control cylinders 26, 28, the carrier part 24 is tilted in relation to the wheel rotation axis 34 to thereby implement an adjustment of the toe and/or camber of the wheel 20 of the wheel suspension 10.

The wheel load is supported in a known manner by a support spring 36 in relation to the body 18. A telescoping shock absorber may optionally be arranged within the support spring 38 but is not shown. In the exemplary embodiment, the wheel 20 is driven via at partly depicted cardan shaft 38, with the cardan shaft 38 extending through the wheel carrier 12 and connected in driving relationship with the wheel axle.

Figure 2:
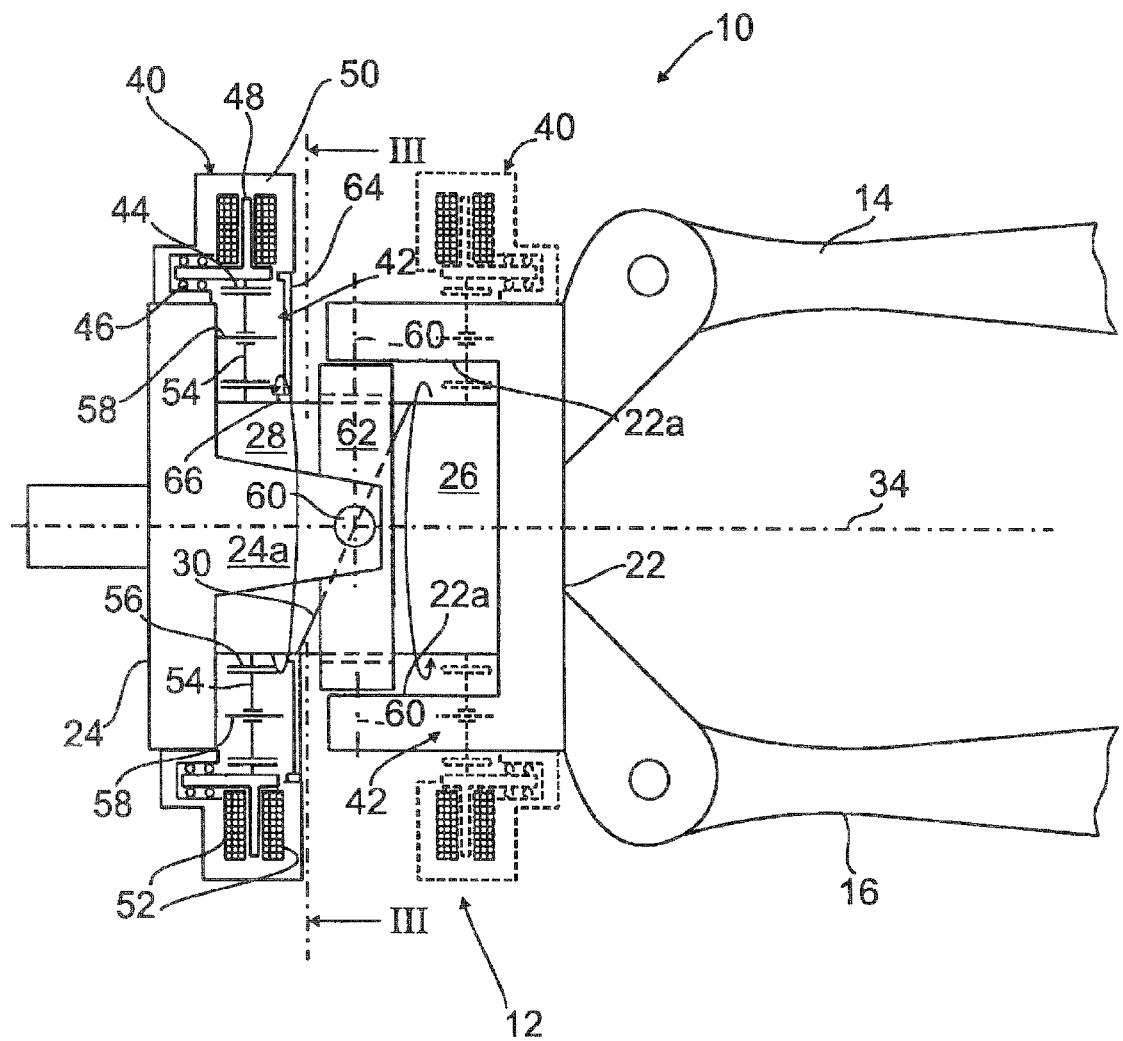
FIG. 2 the wheel carrier of FIG. 1 with the steering-side guide part, the wheel-side carrier part and the two control cylinders, each of which being adjustable by a planetary gear train and an electric disk motor.

FIG. 2 shows in greater detail the actuation of the control cylinders 26, 28 for camber toe adjustment and camber adjustment of the wheel 20.

Each control cylinder 26, 28 is provided with an electric disk motor 40 which respectively drives the annulus 44 of a planetary gear train 42. The disk motor 40 with the planetary gear train 42 on the guide part 22 is shown only with broken lines and is configured essentially the same as mirror image to the disk motor 40 and the planetary gear train 42 on the carrier part 24.

The annulus 44 of the planetary gear train 42 is floatingly supported on the carrier part 24 for rotation via a double-row rolling-contact bearing or ball bearing 46 and has on the outer circumference a ring-shaped disk rotor 48 which is positioned inside the ring-shaped housing 50 of the disk motor 40 and between stator windings 52 arranged in the housing 50.

The internally geared annulus 44 drives via four planet gears 54 (cf. also FIG. 3) a central sun gear 56 which is mounted or formed on the outer circumference of the control cylinder 28. The planet gears 54 are rotatably supported on bearing pins 58 which are mounted on the carrier part 24 and placed symmetrically about the circumference of the sun gear 56.

Formed on the carrier part 24 and on the guide part 22 are diametrically opposite axis-parallel cantilevers 24a, 22a which project out in the shape of a fork and to which a support ring 62 is universally mounted via bearing pins generally designated with 60, with the support ring allowing toe and camber adjustments of the wheel 20 via the control cylinders 26, 28 but prohibiting a relative rotation between the guide part 22 and the carrier part 24 as a result of its function as torque support.

Figure 3:
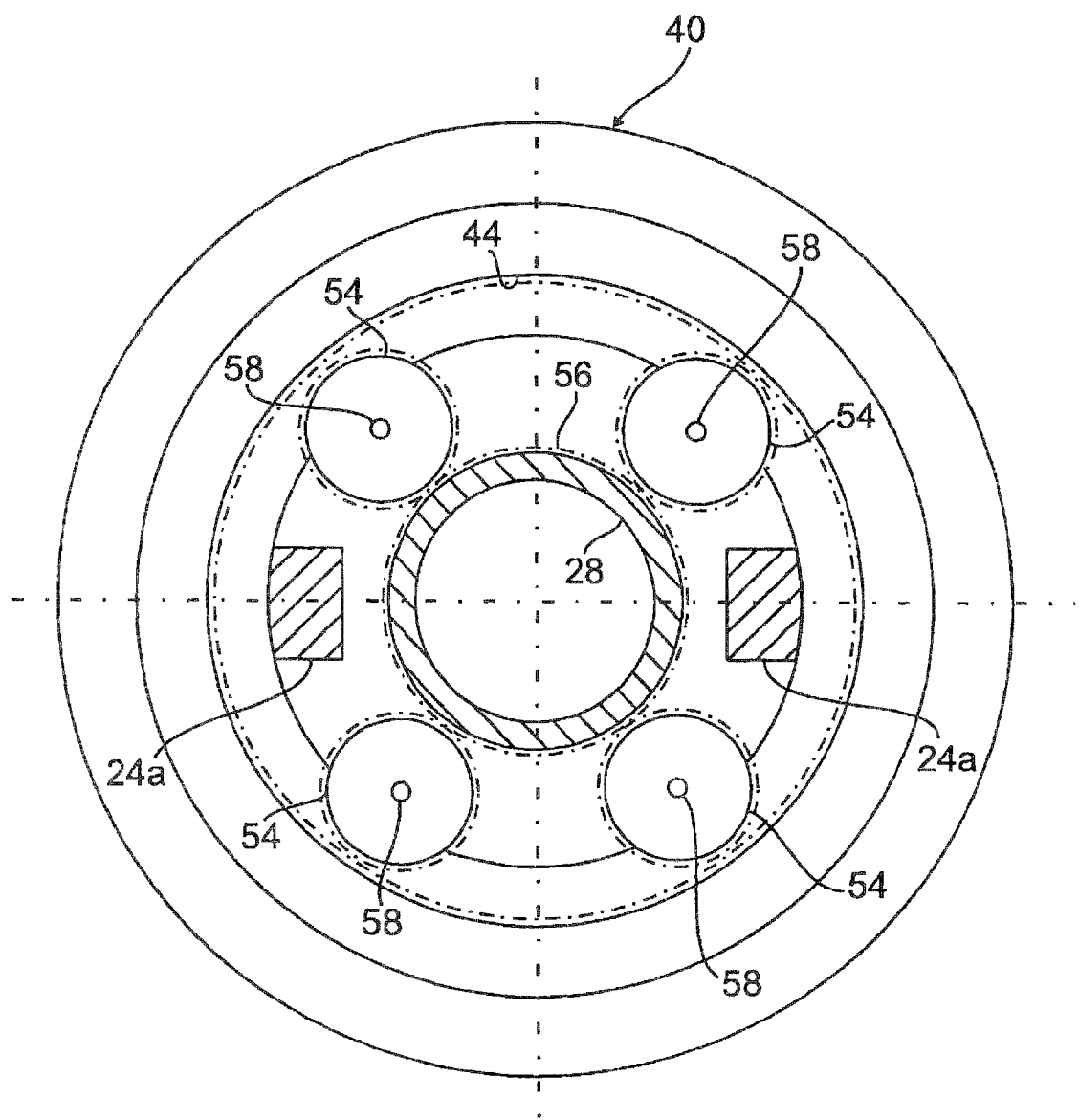
FIG. 3 a cross section through the wheel carrier taken along the line III-III of FIG. 2.

As shown in FIG. 3, the planetary gears 54 are respectively arranged on the carrier part 24 between the cantilevers 24a of the carrier part 24 and connected in driving relationship with the outer annulus 44 and the inner sun gear 56. The arrangement on the guide part 22 involves an arrangement of the planet gears 54 rotated by 90° as the cantilevers 22a are also oriented in offset relationship to the cantilevers 24a.

The control cylinders 26, 28 can be adjusted by the disk motors 40 and the planetary gear trains 42 for adjusting the camber and/or toe of the wheel 20 in both rotational directions in same direction or in opposite direction.

Electromagnetic brakes are further provided on the disk motors 40 in a not shown manner for bringing the disk rotor 48 for example to a standstill by a spring action in the de-energized state and to liberate the disk rotor 48 when activated in response to an activation of the disk motors. This prevents wheel loads to inadvertently adjust the control cylinders 26, 28, when, for example, the vehicle is parked or the disk motors are not activated.

Ring-shaped covering caps 64 are placed between the ring-shaped housing 50 of the disk motors 40 and the control cylinders 26, 28 for covering the planetary gear trains 42 to the outside. The covering caps 64 may optionally be designed of several parts for assembly reasons. Respectively placed between the central opening of the covering caps 64 and the control cylinders 26, 28 are sealing rings 66 which permit rotation of the control cylinders 26, 28.

The invention is not limited to the shown exemplary embodiment. The planetary gear train 24 may optionally also have an externally geared annulus which is driven by a conventional electric motor via a drive shaft and an output pinion. The mentioned brake for support of reaction torques can then be provided in the electric motor or on the drive shaft.

Instead of four planet gears 54, only two planet gears may optionally also be provided which mesh with the annulus 44 and the sun gear 56, resulting in less tooth engagements but yet able to distribute the drive torque symmetrically.

The invention claimed is:

1. A device for adjusting camber and/or toe of a wheel of a wheel suspension, comprising:
    a wheel carrier for rotatably supporting the wheel, said wheel carrier being subdivided in a carrier part holding the wheel, a guide part connected with the wheel suspension, and two rotary parts arranged between the carrier part and the guide part and rotatable relative to one another as well as to the carrier part and to the guide part about a common rotation axis; and
    drive assemblies, each comprised of a drive and a servo drive, to respectively adjust the rotary parts in both rotation directions,
    wherein the servo drive for at least one of the rotary parts is configured as planetary gear train, said planetary gear train being arranged about the at least one rotary part.

2. The device of claim 1 for adjusting camber and/or toe of a wheel of a wheel suspension for a motor vehicle.

3. The device of claim 1, wherein the rotary parts are configured as control cylinders.

4. The device of claim 1, wherein the planetary gear train is arranged about the at least one rotary part radially externally.

5. The device of claim 1, wherein the drive is configured as an electric disk motor, said planetary gear train having an annulus which is driven directly by the electric disk motor.

6. The device of claim 5, wherein the electric disk motor has stator windings which are mounted to a member selected from the group consisting of carrier part and guide part, and a disk rotor, said disk rotor being mounted on an outer circumference of the annulus.

7. The device of claim 6, wherein the planetary gear train has inner planet gears supported on bearing pins of the member.

8. The device of claim 6, further comprising an electromotive brake provided on the disk rotor between the stator windings to bring the disk rotor in de-energized state to a standstill and to disengage when the disk motor is electrically activated.

9. The device of claim 5, wherein the annulus of the planetary gear train is rotatably supported on a member selected from the group consisting of carrier part and guide part.

10. The device of claim 9, further comprising a double-row rolling-contact bearing to floatingly support the annulus on the member.

11. The device of claim 5, wherein the planetary gear train has a sun gear which is connected in fixed rotative engagement with the at least one rotary part, and planet gears in engagement with the annulus and the sun gear.

12. The device of claim 1, wherein the planetary gear train has a sun gear which is connected in fixed rotative engagement with the at least one rotary part.

13. The device of claim 1, wherein each member selected from the group consisting of the carrier part and the guide part has two axis-parallel projecting and diametrically confronting cantilevers for support of a universally mounted support ring.

14. The device of claim 13, wherein the planetary gear train has inner planet gears supported on bearing pins of the member between the cantilevers.

15. The device of claim 13, wherein the planetary gear train has four planet gears distributed symmetrically about a circumference between the cantilevers.

16. The device of claim 1, further comprising a covering cap for encapsulating the planetary gear train.

17. The device of claim 16, wherein the drive is configured as an electric disk motor, said covering cap being provided between the disk motor and the rotary parts.

18. The device of claim 17, wherein the disk motor has a housing, said covering cap being mounted to the housing, and further comprising a central sealing ring supported by the covering cap to sealingly surround the at least one rotary part.

\* \* \* \* \*

UNITED STATES PATENT AND TRADEMARK OFFICE
CERTIFICATE OF CORRECTION

PATENT NO. : 8,322,729 B2  
APPLICATION NO. : 13/320604  
DATED : December 4, 2012  
INVENTOR(S) : Wilfried Michel et al.

Page 1 of 1

It is certified that error appears in the above-identified patent and that said Letters Patent is hereby corrected as shown below:

On the title page, item [56]: Column 2, under FOREIGN DOCUMENTS, line 1, change "DE10 2008 01136" to --DE10 2008 011 367--.

Signed and Sealed this  
Twenty-ninth Day of January, 2013

David J. Kappos  
*Director of the United States Patent and Trademark Office*